May 2, 1933. F. P. RIDDELL 1,906,419
FRUIT CORER
Filed March 16, 1931
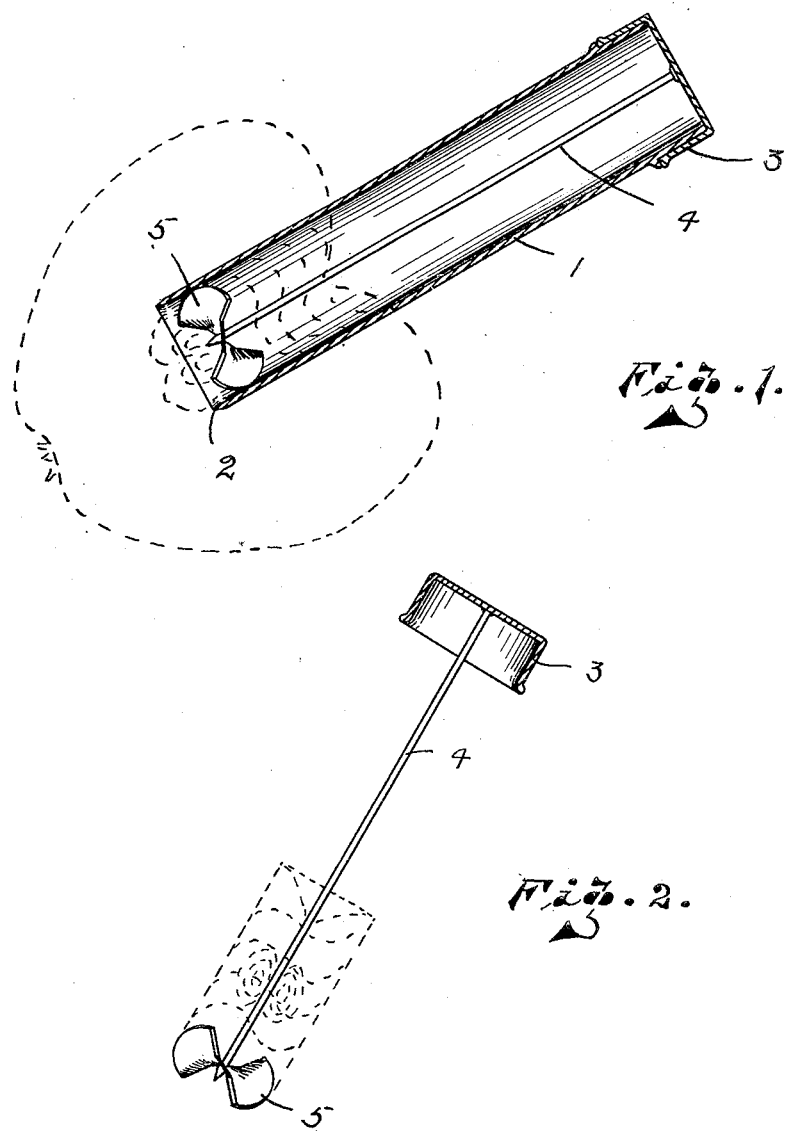
Inventor
Fred P. Riddell.
By Geo. Stevens.
Attorney Patented May 2, 1933

1,906,419

UNITED STATES PATENT OFFICE

FRED P. RIDDELL, OF SUPERIOR, WISCONSIN

FRUIT CORER

Application filed March 16, 1931. Serial No. 522,961.

This invention relates to coring instruments and has special reference to such a device particularly adapted for use in the coring of fruit such as apples, grape fruit, or the like.

The principal object of the invention is to produce a simple, practical, and sanitary device of this character.

Other objects and advantages of the invention will appear in the following description thereof.

Referring now to the accompanying drawing, forming part of this application, and wherein like reference characters indicate like parts:

Figure 1 represents a transverse sectional view of one of the improved instruments; and Figure 2 is an elevation of the cutter portion of the instrument showing the closure to which it is attached in section.

The device comprises a thin metal hollow cylinder 1, suitably sharpened as illustrated at 2 about its open end and provided at its opposite end with a cap-like closure 3 which may be screw threadedly mounted thereupon, or frictionally engaged in some other desired manner, as preferred.

This closure carries axially therewithin a pin 4 which may either be round or rectangular in cross section, as preferred, and which pin extends substantially the entire length of the cylinder and carries upon its free end the propeller like cutter 5, designed to fit snugly within the bore of the cylinder so that when completely assembled as illustrated in Figure 1 of the drawing, the cutter blade occurs at the mouth of the cylinder, and when the latter is forced by rotary motion into the fruit, it will readily enter same, the propeller cutting its way helically into the fruit and tending to impel the cylinder. This process, as is obvious, is continued until the core of the fruit is engaged within the cylinder about the cutter, when the entire instrument may be withdrawn with the core inclosed. Then the closure 3 is removed, drawing with it the propeller and fruit core from the cylinder, when the instrument is readily freed from the core and cleansed.

From the foregoing it is apparent that I have devised an exceedingly simple and sanitary instrument for the purpose intended, and one which may be modified materially from the embodiment here illustrated without departing from the spirit of the invention.

Having thus described my invention, what I claim and desire to secure by Letters Patent, is:

1. A fruit corer comprising in combination a cylindrical casing, a removable closure for one end of the casing, a pin fixed axially to said closure and extending substantially the full length of the casing, and a propeller-like cutter fixed to the pin adjacent the open end of the casing, whereby when assembled and forced by rotative action into an object, a core will be formed within the casing and readily removed therewith from the object.

2. A fruit corer comprising in combination a cylindrical casing, a removable pin supported axially with the casing, a propeller-like cutter mounted on and adjacent one end of the pin and means for frictionally uniting said casing and pin whereby when the assembled instrument is forced into an object by rotary motion a core of the object will be formed within the casing.

In testimony whereof I affix my signature.

FRED P. RIDDELL.